(12) United States Patent
Imai

(10) Patent No.: US 12,314,804 B2
(45) Date of Patent: May 27, 2025

(54) READING SYSTEM AND READING METHOD

(71) Applicant: ISUZU MOTORS LIMITED, Tokyo (JP)

(72) Inventor: Akira Imai, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 69 days.

(21) Appl. No.: 17/905,513

(22) PCT Filed: Mar. 10, 2021

(86) PCT No.: PCT/JP2021/009532
§ 371 (c)(1),
(2) Date: Sep. 2, 2022

(87) PCT Pub. No.: WO2021/182510
PCT Pub. Date: Sep. 16, 2021

(65) Prior Publication Data
US 2023/0132833 A1    May 4, 2023

(30) Foreign Application Priority Data
Mar. 11, 2020  (JP) .................. 2020-041745

(51) Int. Cl.
*G06K 7/10*    (2006.01)
(52) U.S. Cl.
CPC ................ *G06K 7/10366* (2013.01)
(58) Field of Classification Search
CPC .................................. G06K 7/10366
(Continued)

(56) References Cited
U.S. PATENT DOCUMENTS 7,866,555 B2 *   1/2011  Schmid .............. G06K 19/0723
                                                705/28
2009/0026263 A1 * 1/2009 Schmid ............ G06K 19/07758
                                                340/10.1
(Continued)

FOREIGN PATENT DOCUMENTS

CN    104743366 A    7/2015
CN    105868801 A    8/2016
(Continued)

OTHER PUBLICATIONS

International Search Report of PCT/JP2021/009532 dated May 25, 2021.

*Primary Examiner* — Daniel A Hess
(74) *Attorney, Agent, or Firm* — Shih IP Law Group, PLLC

(57) ABSTRACT

A reading system includes a controller that is mounted on a vehicle, and a reader that reads a tag of a load placed in a load chamber of the vehicle, wherein the controller includes a second determination part that determines whether the door of the load chamber is closed, and a displacement control part that displaces the load chamber in accordance with a timing when the tag information acquisition part acquires the identification information if the second determination part determines that the door of the load chamber is closed, wherein the reader includes a first determination part that determines whether a door of the load chamber is closed, and a tag information acquisition part that acquires identification information stored in the tag through non-contact communication if the first determination part determines that the door of the load chamber is closed.

10 Claims, 5 Drawing Sheets

(58) Field of Classification Search
USPC .......................................................... 235/451
See application file for complete search history.

(56) References Cited

U.S. PATENT DOCUMENTS

2019/0294942 A1    9/2019  Sorli et al.
2021/0387808 A1*  12/2021  Kalouche ............. B65G 1/1376

FOREIGN PATENT DOCUMENTS

| CN | 110126663  A | 8/2019 |
| CN | 110337654  A | 10/2019 |
| JP | 2005320126  A | 11/2005 |
| JP | 2007080102  A | 3/2007 |
| JP | 2007-137553  A | 6/2007 |
| JP | 2008-137794  A | 6/2008 |
| JP | 2008133085  A | 6/2008 |
| JP | 2010-204802  A | 9/2010 |
| JP | 2020095300  A | 6/2020 |

* cited by examiner

READING SYSTEM AND READING METHOD

CROSS REFERENCE TO RELATED APPLICATION

The present application is a U.S. National Stage entry of PCT Application number PCT/JP2021/9532, filed on Mar. 10, 2021, which claims priority under 35 U.S.C § 119 (a) to Japanese Patent Application No. 2020-041745, filed on Mar. 11, 2020, contents of which are incorporated herein by reference in their entirety.

TECHNICAL FIELD

The present disclosure relates to a reading system and a reading method for reading information stored in a tag.

BACKGROUND ART

A reader is known that reads information stored in a wireless IC tag attached to a load through non-contact communication, and determines whether or not the load is correctly carried into a load chamber of a vehicle on the basis of the read information (for example, see Patent Document 1).

PRIOR ART

Patent Document

Patent Document 1: Japanese Unexamined Patent Application Publication No. 2005-320126

SUMMARY OF INVENTION

Problems to be Solved by the Invention

A reader disclosed in Patent Document 1 sometimes failed to read the information stored in a tag if the tag attached to a load was not properly oriented.

The present disclosure focuses on this point, and an object thereof is to provide a reading system or a reading method capable of improving the accuracy of reading information stored in a tag.

Means for Solving the Problems

A reading system according to a first aspect of the present disclosure includes a controller that is mounted on a vehicle, and a reader that reads a tag of a load placed in a load chamber of the vehicle, wherein the reader includes a first determination part that determines whether a door of the load chamber is closed, and a tag information acquisition part that acquires identification information stored in the tag through non-contact communication if the first determination part determines that the door of the load chamber is closed, wherein the controller includes a second determination part that determines whether the door of the load chamber is closed, and a displacement control part that displaces the load chamber in accordance with a timing when the tag information acquisition part acquires the identification information if the second determination part determines that the door of the load chamber is closed.

The displacement control part may displace the load chamber by tilting the load chamber. The displacement control part may displace the load chamber by vibrating the load chamber. The displacement control part may displace the load chamber by driving an air suspension of the vehicle. The displacement control part may displace the load chamber by driving an engine of the vehicle.

The controller further may include an acquisition part that acquires, from a wireless terminal, instruction information indicating that all the identification information contained in list information indicating a list of identification information of tags attached to a plurality of loads to be loaded in the load chamber has not been acquired, wherein the displacement control part may displace the load chamber if the acquisition part acquires the instruction information.

A reading system according to a second aspect of the present disclosure includes a controller that is mounted on a vehicle, and a reader that reads a tag of a load placed in a load chamber of the vehicle, wherein the controller includes a second determination part that determines that a door of the load chamber is closed, and a displacement control part that displaces the load chamber if the second determination part determines that the door of the load chamber is closed, wherein the reader includes a first determination part that determines whether the door of the load chamber is closed, and a tag information acquisition part that acquires identification information stored in the tag through non-contact communication in accordance with a timing when the displacement control part displaces the load chamber if the first determination part determines that the door of the load chamber is closed.

A reading method according to a third aspect of the present disclosure is a reading method executed by a reader for reading a tag of a load placed in a load chamber of a vehicle, the method includes the steps of determining whether a door of the load chamber is closed, and acquiring identification information stored in the tag through non-contact communication if the door of the load chamber is determined to be closed, wherein the method executed by a controller mounted on the vehicle comprising the steps of determining whether the door of the load chamber is closed, and displacing the load chamber in accordance with the timing of acquiring the identification information if the door of the load chamber is determined to be closed.

Effect of the Invention

According to the present disclosure, it is possible to improve the accuracy of reading information stored in a tag.

DESCRIPTION OF EMBODIMENTS

First Embodiment

Figure 1:
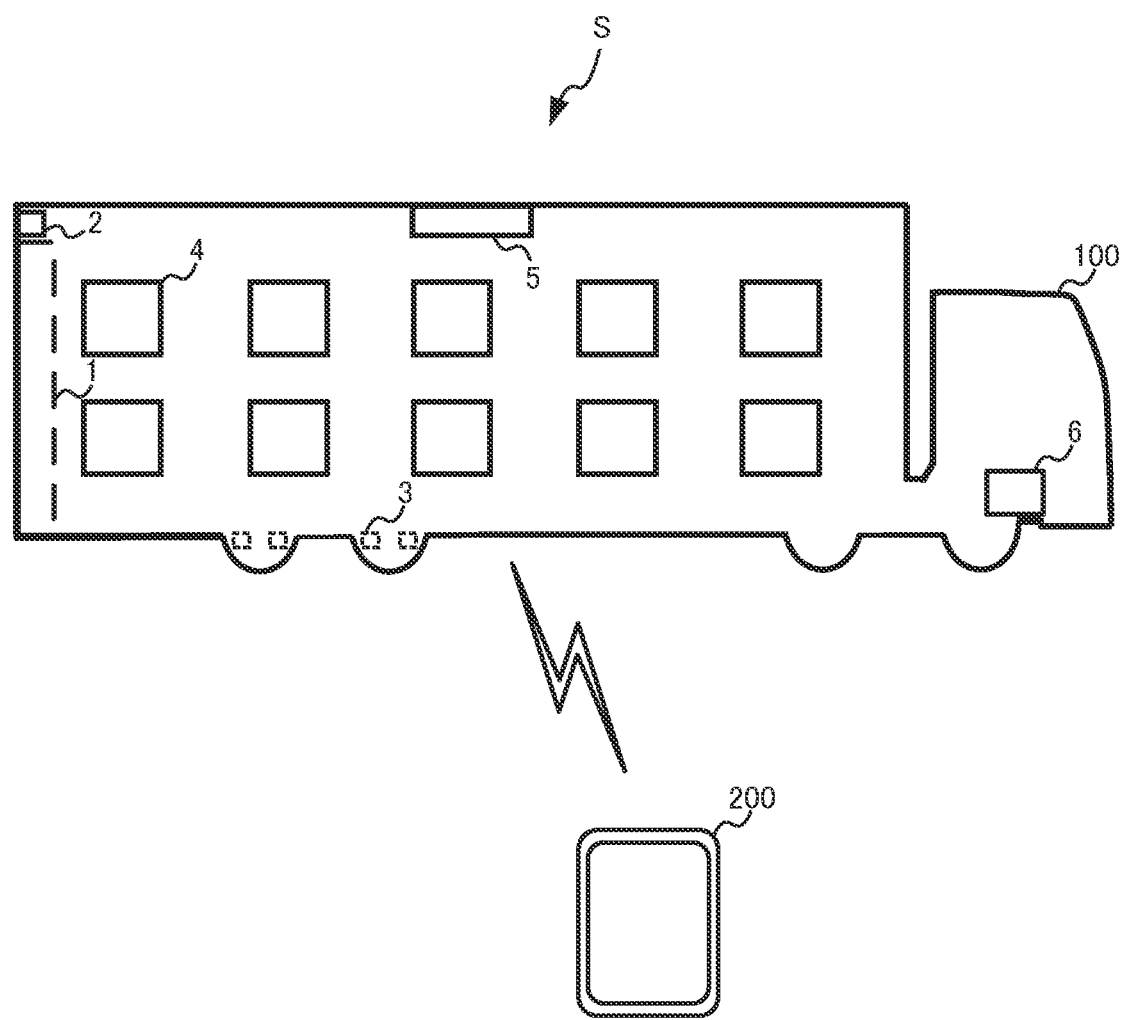
FIG. 1 shows an overview of a reading system according to a first embodiment.

[Overview of Reading System]
FIG. 1 shows an overview of a reading system S according to a first embodiment. The reading system S includes a door 1, an open/closed sensor 2, an air suspension 3, a communication element 4, a reader 5, and a controller 6. A vehicle 100 on which the reading system S is mounted is a truck having a load chamber for loading a load, for example. The walls and ceiling of the load chamber are made of metal plates.

The door 1 is used to carry the load into the load chamber of the vehicle 100. In FIG. 1, the door 1 is shown by a dashed line. The open/closed sensor 2 detects whether or not the door 1 is closed. The air suspension 3 is an air spring that can adjust the height of the load chamber by adjusting an amount of air supplied from a compressor (not shown in figures). A plurality of air suspensions 3 are arranged at a rear of the vehicle 100.

The communication element 4 is installed in the load chamber of the vehicle 100. For example, the communication element 4 is installed on the side wall of the load chamber. The communication element 4 is a coiled antenna, for example. The communication element 4 reads a tag attached to a load in the load chamber. The tag is a Radio Frequency IDentifier (RFID) tag without a battery, for example. The tag stores identification information for identifying the tag. The identification information is Tag ID (TID) or Electronic Product Code (EPC), for example. The communication element 4 supplies power for wireless communication to the tag using a contactless power supply method such as a radio wave method, and receives the identification information transmitted by the tag.

A plurality of communication elements 4 are disposed in the load chamber. By slightly shifting the timing of emitting radio waves, the communication element 4 can read tags almost simultaneously while suppressing interference of the radio waves among the plurality of communication elements 4. Further, the communication elements 4 can read a plurality of tags almost simultaneously by slightly shifting the timing of communication with each of the plurality of tags.

The reader 5 is an RFID reader, for example. The reader 5 reads the tag of the load placed in the load chamber of the vehicle 100, via the communication element 4. The reader 5 is connected to the open/closed sensor 2. The reader 5 determines whether or not the door of the load chamber is closed on the basis of a detection result of the open/closed sensor 2. The reader 5 reads the identification information stored in the tag through non-contact communication if the door of the load chamber is determined to be closed.

The reader 5 is connected to an antenna element (not shown in figures) that is installed outside the load chamber. The reader 5 communicates with a wireless terminal 200 via that antenna element. For example, the reader 5 transmits the read identification information of the tag to the wireless terminal 200.

The wireless terminal 200 is a smartphone, for example. The wireless terminal 200 communicates with the reader 5. The wireless terminal 200 receives the identification information of the tag read by the reader 5, from the reader 5. The wireless terminal 200 lists the received identification information on a display part.

The controller 6 is an Electronic Control part (ECU), for example. The controller 6 is mounted on the vehicle 100. Similar to the reader 5, the controller 6 is connected to the open/closed sensor 2. The controller 6 determines whether or not the door of the load chamber is closed on the basis of the detection result of the open/closed sensor 2. If the controller 6 determines that the door of the load chamber is closed, the controller 6 displaces the load chamber of the vehicle 100 in accordance with the timing of reading the tag by the reader 5. For example, the controller 6 displaces the load chamber of the vehicle 100 by driving the air suspension 3 or the like.

At this time, the relationship between a direction of the radio waves emitted by the communication element 4 and an orientation of a coil built in the tag changes during tag reading, causing the coil to temporarily assume the orientation suitable for receiving the radio waves. In this way, the controller 6 can improve the accuracy of reading the tag by the reader 5.

Since the reader 5 acquires the identification information when the door 1 of the load chamber is closed, the radio waves emitted by the communication element 4 can be restricted from leaking outside the load chamber. Therefore, the reader 5 can be restricted from acquiring the identification information of the tag attached to the load outside the load chamber.

[Configuration of Reading System]

Figure 2:
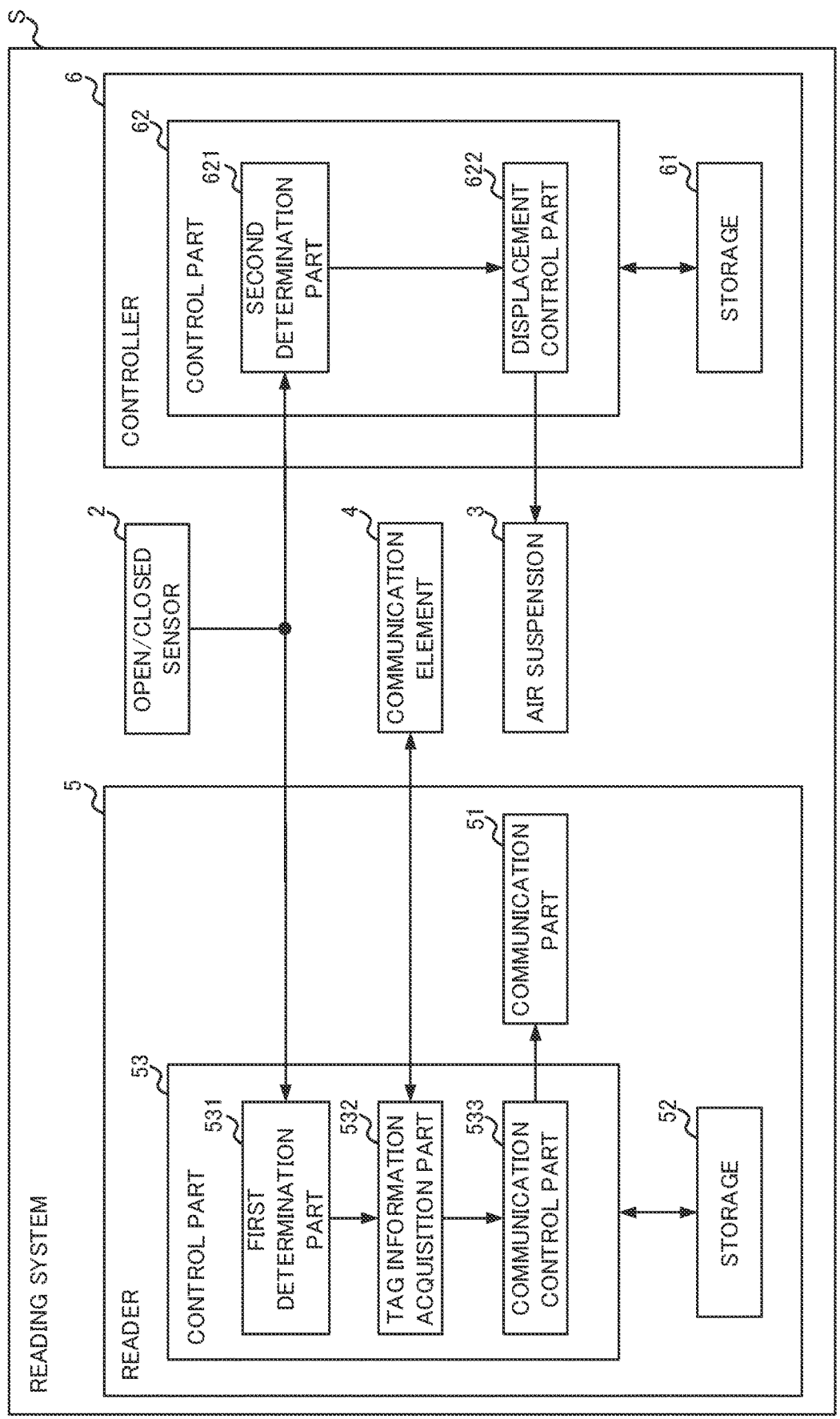
FIG. 2 shows an internal configuration of the reading system.

FIG. 2 shows an internal configuration of the reading system S. The reading system S includes the open/closed sensor 2, the air suspension 3, the communication element 4, the reader 5, and the controller 6. The reader 5 includes a communication part 51, a storage 52, and a control part 53. The controller 6 includes a storage 61 and a control part 62.

[Configuration of Reader]

The communication part 51 is a communication module for communicating with the wireless terminal 200 via the antenna element. The storage 52 includes, for example, a Read Only Memory (ROM), a Random Access Memory (RAM), and the like. The storage 52 stores various programs and various types of data for causing the control part 53 to function. The control part 53 is a Central Processing Unit (CPU), for example. The control part 53 functions as a first determination part 531, a tag information acquisition part 532, and a communication control part 533 by executing the program stored in the storage 52.

The first determination part 531 determines whether or not the door 1 of the load chamber is closed on the basis of the detection result of the open/closed sensor 2. If the first determination part 531 determines that the door 1 of the load chamber is closed, the tag information acquisition part 532 operates the communication element 4 in a predetermined reading period to acquire the identification information stored in the tag via the communication element 4 through the non-contact communication. The tag information acquisition part 532 does not acquire the identification information stored in the tag if the first determination part 531 determines that the door 1 of the load chamber is not closed. The communication control part 533 communicates with the wireless terminal 200 via the communication part 51. The communication control part 533 transmits the identification information acquired by the tag information acquisition part 532 to the wireless terminal 200. At this time, the communication control part 533 transmits reading start information indicating that the reading is started at the start of the reading period, and sequentially transmits the plurality of pieces of identification information acquired by the tag information acquisition part 532 within the reading period.

[Configuration of Controller]

The storage 61 includes a ROM and a RAM, for example. The storage 61 stores various programs and various types of data for causing the control part 62 to function. The control part 62 functions as a second determination part 621 and a displacement control part 622 by executing the program stored in the storage 61.

The second determination part 621 determines whether or not the door 1 of the load chamber is closed on the basis of the detection result of the open/closed sensor 2. If the second determination part 621 determines that the door 1 of the load chamber is closed, the displacement control part 622 displaces the load chamber in accordance with the timing of reading the tag by the communication element 4. For example, the displacement control part 622 displaces the load chamber by driving the air suspension 3 of the vehicle 100. More specifically, the displacement control part 622 vibrates the load chamber by increasing or decreasing an amount of air supplied to the air suspension 3. The load chamber may be vibrated by driving a starter or engine (both not shown in figures) of the vehicle 100.

Further, the displacement control part 622 is not limited to an example in which the load chamber is displaced by vibrating the load chamber. The displacement control part 622 may displace the load chamber by tilting the load chamber. The displacement control part 622 does not displace the load chamber if the second determination part 621 determines that the door 1 of the load chamber is not closed.

[Configuration of Wireless Terminal]

Figure 3:
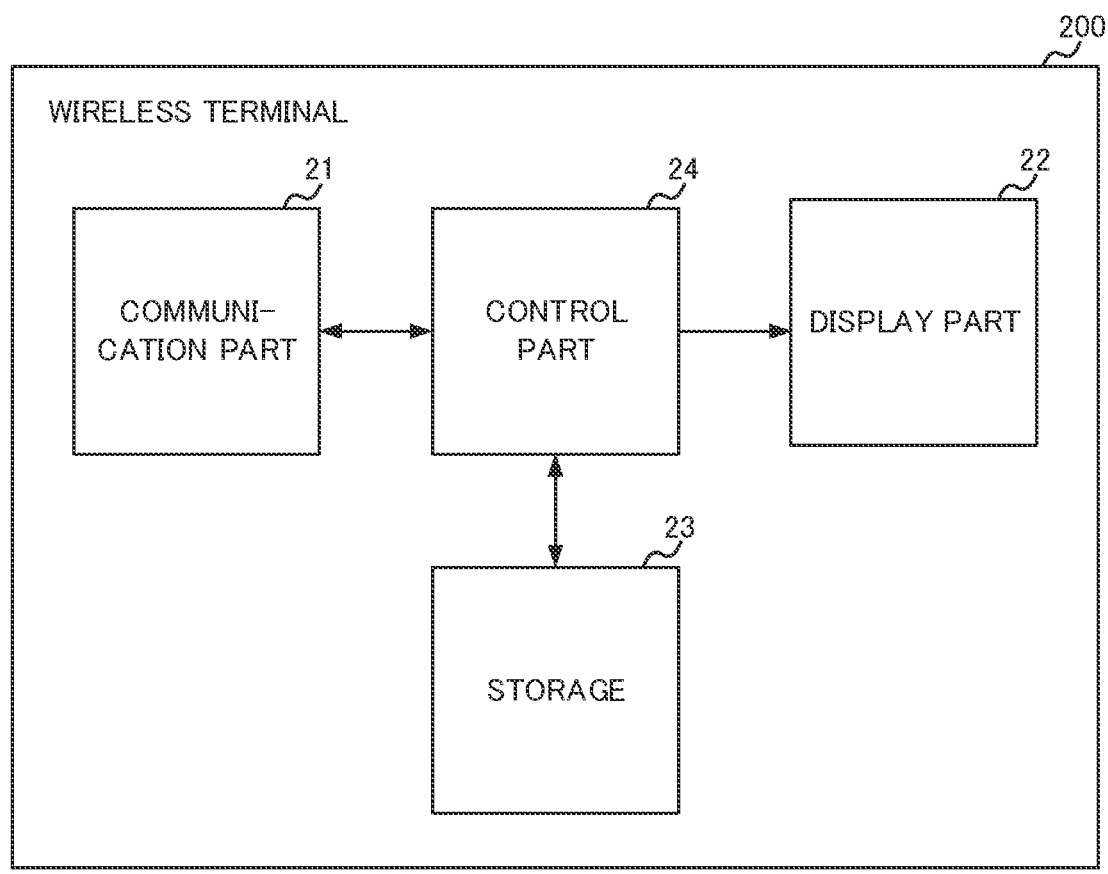
FIG. 3 shows a configuration of a wireless terminal.

FIG. 3 shows a configuration of the wireless terminal 200. The wireless terminal 200 includes a communication part 21, a display part 22, a storage 23, and a control part 24.

The communication part 21 is a communication module for communicating with the reader 5 via wireless communication. The display part 22 is a display for displaying various kinds of information. The storage 23 includes a ROM and a RAM, for example. The storage 23 stores various programs and various types of data for causing the control part 24 to function.

The control part 24 is a CPU, for example. The control part 24 executes various kinds of processing by executing the program stored in the storage 23. The control part 24 communicates with the reader 5 via the communication part 21. The control part 24 receives the identification information of the plurality of tags read by the reader 5 within the reading period, from the reader 5. The control part 24 lists the received identification information of the tags on the display part 22.

[Processing for Tag Reading]

Figure 4:
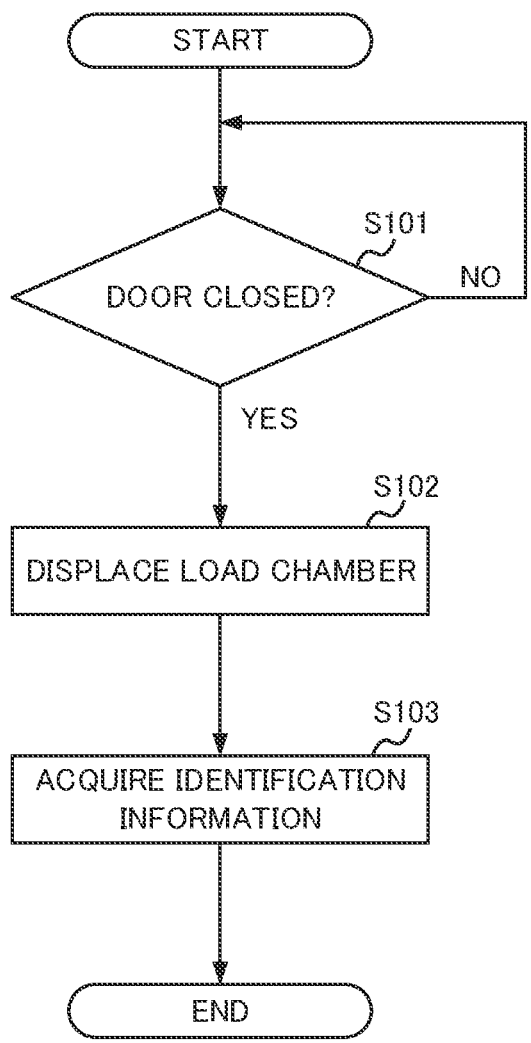
FIG. 4 is a flowchart showing processing for reading a tag by the reading system.

FIG. 4 is a flowchart showing processing for reading the tag by the reading system S. This processing is started when power is turned on to the reader 5, for example. First, the second determination part 621 determines whether or not the door 1 of the load chamber is closed on the basis of the detection result of the open/closed sensor 2 (step S101). If the second determination part 621 determines that the door 1 of the load chamber is closed (YES in step S101), the displacement control part 622 displaces the load chamber (step S102). The tag information acquisition part 532 acquires the identification information stored in the tag through the non-contact communication (step S103), and ends the processing. If the second determination part 621 determines that the door 1 of the load chamber is not closed in the determination of step S101 (NO in step S101), the displacement control part 622 repeats the determination in step S101.

[Effect of Reading System of First Embodiment]

According to the first embodiment, the displacement control part 622 displaces the tag of the load relative to the communication element 4 in accordance with the timing of reading the tag by the tag information acquisition part 532. Therefore, the displacement control part 622 can improve the accuracy of the tag reading by the tag information acquisition part 532. Further, since the tag information acquisition part 532 does not acquire the identification information if the first determination part 531 determines that the door 1 of the load chamber is not closed, the radio waves emitted by the communication element 4 can be restricted from leaking outside the load chamber.

Second Embodiment

The second embodiment describes an example in which the displacement control part displaces the load chamber if the tag information acquisition part 532 does not acquire the identification information of the tag as scheduled. The control part 24 of the wireless terminal 200 communicates with an external device, the reader 5, and the controller 6 via the communication part 21. The external device is a server possessed by an administrator who manages an operation of the vehicle 100, for example.

The control part 24 acquires list information indicating a list of the identification information of the tags attached to a plurality of loads to be loaded in the load chamber of the vehicle 100, from the external device. For example, the control part 24 acquires the list information from the external device when an application for displaying the identification information of the tag is started.

The control part 24 acquires the identification information of the tag acquired by the tag information acquisition part 532, from the reader 5. The control part 24 sequentially receives the identification information of the plurality of tags from the reader 5 until the end of the reading period, which starts when a reading start signal is received from the reader 5.

The control part 24 determines whether or not the tag information acquisition part 532 has acquired all the identification information of the tags contained in the list information acquired from the external device. If the control part 24 determines that the tag information acquisition part 532 has not finished acquiring all the identification information of the tags contained in the list information, the control part 24 sends instruction information to the reader 5 and the controller 6 indicating that the tag information acquisition part 532 has not finished acquiring all identification information contained in the list information. The control part 24 lists on the display part 22 whether or not the tag information acquisition part 532 has acquired the identification information contained in the list information. The control part 24 lists on the display part 22 which of the plurality of pieces of identification information contained in the list information has been acquired by the tag information acquisition part 532, for example.

The tag information acquisition part 532 of the reader 5 acquires the instruction information from the wireless terminal 200. When the tag information acquisition part 532 acquires the instruction information, the tag information acquisition part 532 acquires the identification information of the tag again in a second reading period. The communication control part 533 of the reader 5 transmits the reading start information indicating that the reading is started at the start of the second reading period, to the wireless terminal 200. The communication control part 533 sequentially transmits the plurality of pieces of identification information acquired by the tag information acquisition part 532 during the second reading period, to the wireless terminal 200. The control part 24 of the wireless terminal 200 lists on the display part 22 whether or not the tag information acquisition part 532 has acquired the identification information contained in the list information, as described above. The control part 24 adds the identification information of the tag received during the second reading period among the identification information of the tag not received during a first reading period, to the identification information acquired by the tag information acquisition part 532 in the list display.

Figure 5:
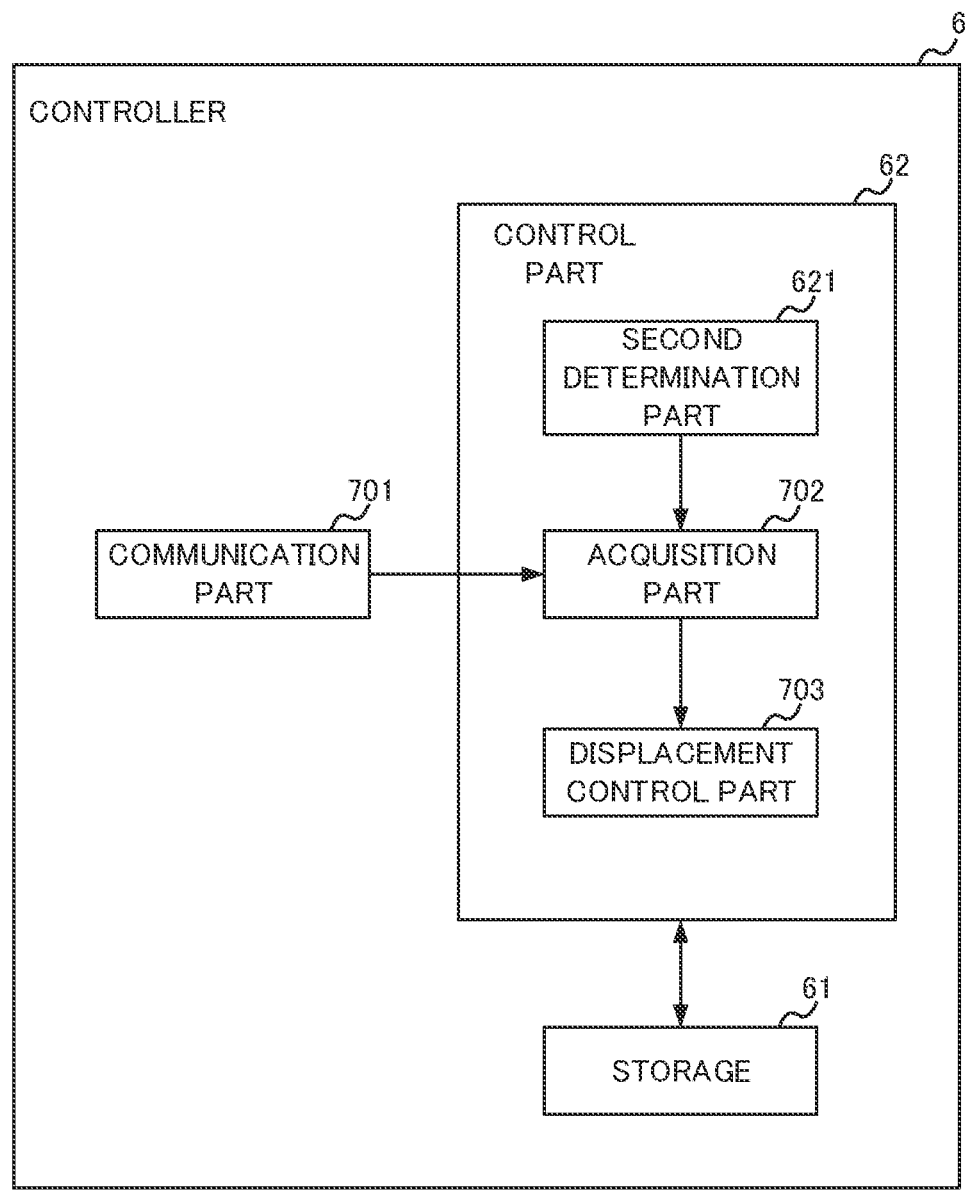
FIG. 5 shows a configuration of a controller according to a second embodiment.

FIG. 5 shows a configuration of the controller 6 according to the second embodiment. The controller 6 includes a communication part 701, the storage 61 and the control part 62. The control part 62 functions as the second determination part 621, an acquisition part 702, and a displacement control part 703. Functional blocks similar to those of the controller 6 in FIG. 2 are denoted by the same reference numerals, and description thereof is omitted.

The communication part 701 is a communication module for communicating with the wireless terminal 200. The acquisition part 702 communicates with the wireless terminal 200 via the communication part 701. The acquisition part 702 acquires, from the wireless terminal 200, the instruction information indicating that the tag information acquisition part 532 has not acquired all the identification information of the tag contained in the list information within the first reading period. The acquisition part 702 outputs the acquired instruction information to the displacement control part 703.

When the acquisition part 702 acquires the instruction information, the displacement control part 703 displaces the load chamber in accordance with the timing when the tag information acquisition part 532 acquires the identification information again. On the other hand, when the acquisition part 702 does not acquire the instruction information, the displacement control part 703 does not displace the load chamber.

[Effect of Reading System of Second Embodiment]

According to the second embodiment, when the tag information acquisition part 532 does not acquire all the identification information of the tags contained in the list information, the tag information acquisition part 532 acquires the identification information of the tags again over the second reading period. The displacement control part 703 displaces the load chamber during another reading, thus improving the accuracy of the tag reading.

In the first and second embodiments, an example has been described in which the tag information acquisition part 532 acquires the identification information of the tag immediately after the first determination part 531 determines that the door 1 of the load chamber is closed, but the present disclosure is not limited thereto. For example, the tag information acquisition part 532 may acquire the identification information of the tag if the first determination part 531 determines that the door 1 of the load chamber is closed and the communication control part 533 receives operation information instructing to read the tag, from the wireless terminal 200. In this case, the displacement control part 622 may displace the load chamber in accordance with the timing when the tag information acquisition part 532 acquires the identification information.

[Variation]

According to the first embodiment, the displacement control part 622 is described as an example in which the tag of the load is relatively displaced with respect to the communication element 4 in accordance with the timing of reading the tag by the tag information acquisition part 532. However, the present disclosure is not limited thereto. For example, the displacement control part 622 displaces the load chamber if the second determination part 621 determines that the door of the load chamber is closed. The tag information acquisition part 532 may be configured to read the identification information stored in the tag through the non-contact communication in accordance with the timing when the displacement control part 622 relatively displaces the tag of the load with respect to the communication element 4 if the first determination part 531 detects that the door 1 of the load chamber is closed. In this way, the tag information acquisition part 532 can improve the accuracy of the tag reading.

The present disclosure is explained on the basis of the exemplary embodiments. The technical scope of the present disclosure is not limited to the scope explained in the above embodiments and it is possible to make various changes and modifications within the scope of the disclosure. For example, all or part the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF SYMBOLS 1 door
2 open/closed sensor
3 air suspension
4 communication element
5 reader
6 controller
21 communication part
22 display part
23 storage
24 control part
51 communication part
52 storage
53 control part
61 storage
62 control part
100 vehicle
200 wireless terminal
531 first determination part
532 tag information acquisition part
533 communication control part
621 second determination part
622 displacement control part
701 communication part
702 acquisition part
703 displacement control part

What is claimed is:

1. A reading system comprising:
a controller that is mounted on a vehicle; and
a reader that reads a tag of a load placed in a load chamber of the vehicle,
wherein the reader includes:
  a reader determination part that determines that a door of the load chamber is closed, and
  a tag information acquisition part that acquires, via a communication element placed in the load chamber, identification information stored in the tag through non-contact communication for a closed door determination of the load chamber by the reader determination part, and
wherein the controller includes:
  a controller determination part that determines that the door of the load chamber is closed, and
  a displacement control part that changes a position of the load chamber relative to a body of the vehicle so that a relationship between a position of the communication element and a position of the tag may change in accordance with a timing when the tag information acquisition part acquires the identification information for a closed door determination of the load chamber by the controller determination part.

2. The reading system according to claim 1, wherein the displacement control part changes the position of the load chamber by tilting the load chamber.

3. The reading system according to claim 1, wherein the displacement control part changes the position of the load chamber by vibrating the load chamber.

4. The reading system according to claim 1, wherein the displacement control part changes the position of the load chamber by driving an air suspension of the vehicle.

5. The reading system according to claim 1, wherein the displacement control part changes the position of the load chamber by driving an engine of the vehicle.

6. The reading system according to claim 1, wherein the controller further includes:
an acquisition part that acquires, from a wireless terminal, instruction information indicating that all the identification information contained in list information indicating a list of identification information of tags attached to a plurality of loads to be loaded in the load chamber has not been acquired,
wherein the displacement control part changes the position of the load chamber if the acquisition part acquires the instruction information.

7. The reading system according to claim 1, wherein the displacement control part does not change the position of the load chamber for an unclosed door determination of the load chamber by the controller determination part.

8. The reading system according to claim 1, wherein the reader further includes:
a plurality of communication elements placed in the load chamber,
wherein the tag information acquisition part acquires identification information stored in the tag through non-contact communication by making the plurality of communication elements emit the electrical wave at times different from each other for a closed door determination of the load chamber by the reader determination part.

9. A reading system comprising:
a controller that is mounted on a vehicle; and
a reader that reads a tag of a load placed in a load chamber of the vehicle,
wherein the controller includes:
a controller determination part that determines that a door of the load chamber is closed, and
a displacement control part that changes a position of the load chamber relative to a body of the vehicle for a closed door determination of the load chamber by the controller determination part, and
wherein the reader includes:
a reader determination part that determines that the door of the load chamber is closed, and
a tag information acquisition part that acquires, via a communication element placed in the load chamber identification information stored in the tag through non-contact communication in accordance with a timing when the displacement control part displaces changes the position of the load chamber for a closed door determination of the load chamber by the reader determination part,
wherein
the displacement control part changes the position of the load chamber relative to the body of the vehicle so that a relationship between a position of the communication element and a position of the tag may change for a closed door determination of the load chamber by the reader determination part in accordance with a timing when the tag information acquisition part acquires the identification information.

10. A reading method executed by a reader for reading a tag of a load placed in a load chamber of a vehicle and by a controller mounted on the vehicle, the method comprising the steps of:
determining, by the reader, whether a door of the load chamber is closed; and
acquiring, by the reader via a communication element placed in the load chamber, identification information stored in the tag through non-contact communication for a closed door determination of the load chamber,
determining, by the controller, that the door of the load chamber is closed; and
changing, by the controller, the position of the load chamber relative to a body of the vehicle so that a relationship between a position of the communication element and a position of the tag may change in accordance with the timing of acquiring the identification information for a closed door determination of the load chamber.

* * * * *